(No Model.)  5 Sheets—Sheet 1.

F. H. RICHARDS.
WEIGHING MACHINE.

No. 570,303. Patented Oct. 27, 1896.

Witnesses:
Chas. L. Schmelz
Fred. J. Dole.

Inventor:
F. H. Richards.

THE NORRIS PETERS CO., PHOTO-LITHO., WASHINGTON, D. C.

(No Model.)　　　　　　　　　　　　　　　　5 Sheets—Sheet 2.
F. H. RICHARDS.
WEIGHING MACHINE.

No. 570,303.　　　　　　　　Patented Oct. 27, 1896.

Witnesses:
Chas. F. Schmelz
Fred. J. Dole

Inventor:
F. H. Richards (No Model.)  5 Sheets—Sheet 3.
F. H. RICHARDS.
WEIGHING MACHINE.

No. 570,303. Patented Oct. 27, 1896.

Witnesses:
Chas. F. Schmelz
Fred. J. Dole.

Inventor:
F. H. Richards.

(No Model.)  5 Sheets—Sheet 4.

F. H. RICHARDS.
WEIGHING MACHINE.

No. 570,303.   Patented Oct. 27, 1896.

Witnesses:
Chas. F. Schmelz
Fred. J. Dole.

Inventor:
F. H. Richards.

(No Model.)

F. H. RICHARDS.
WEIGHING MACHINE.

No. 570,303.

5 Sheets—Sheet 5.

Patented Oct. 27, 1896.

Witnesses:
Chas. F. Shmelz
Fred. J. Dole.

Inventor:
F.H. Richards

UNITED STATES PATENT OFFICE.

FRANCIS H. RICHARDS, OF HARTFORD, CONNECTICUT.

WEIGHING-MACHINE.

SPECIFICATION forming part of Letters Patent No. 570,303, dated October 27, 1896.

Application filed August 24, 1896. Serial No. 603,687. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to weighing-machines for automatically weighing and delivering predetermined loads or charges of granular or pulverulent substances and fluids of various sorts in relatively large lots and with rapidity and precision.

With respect to one of its features my present invention comprehends the employment of the following instrumentalities: Main, rough, and auxiliary weighing mechanisms, such main and auxiliary mechanisms being adapted to weigh jointly the true load, the rough weighing mechanism being operable for weighing and delivering, bodily or in bulk, a mass of material to the main weighing mechanism, such contents constituting the major part of the true load, the residue or balance of the true load being supplied by the auxiliary weighing mechanism, the charge of which is also delivered to said main weighing mechanism.

Another object of the invention is the provision of improved safety devices so organized as to insure the sequential operation of the respective working parts in a regular or determined order, so that liability of the material to waste during the process of weighing will be wholly removed.

Figure 1:
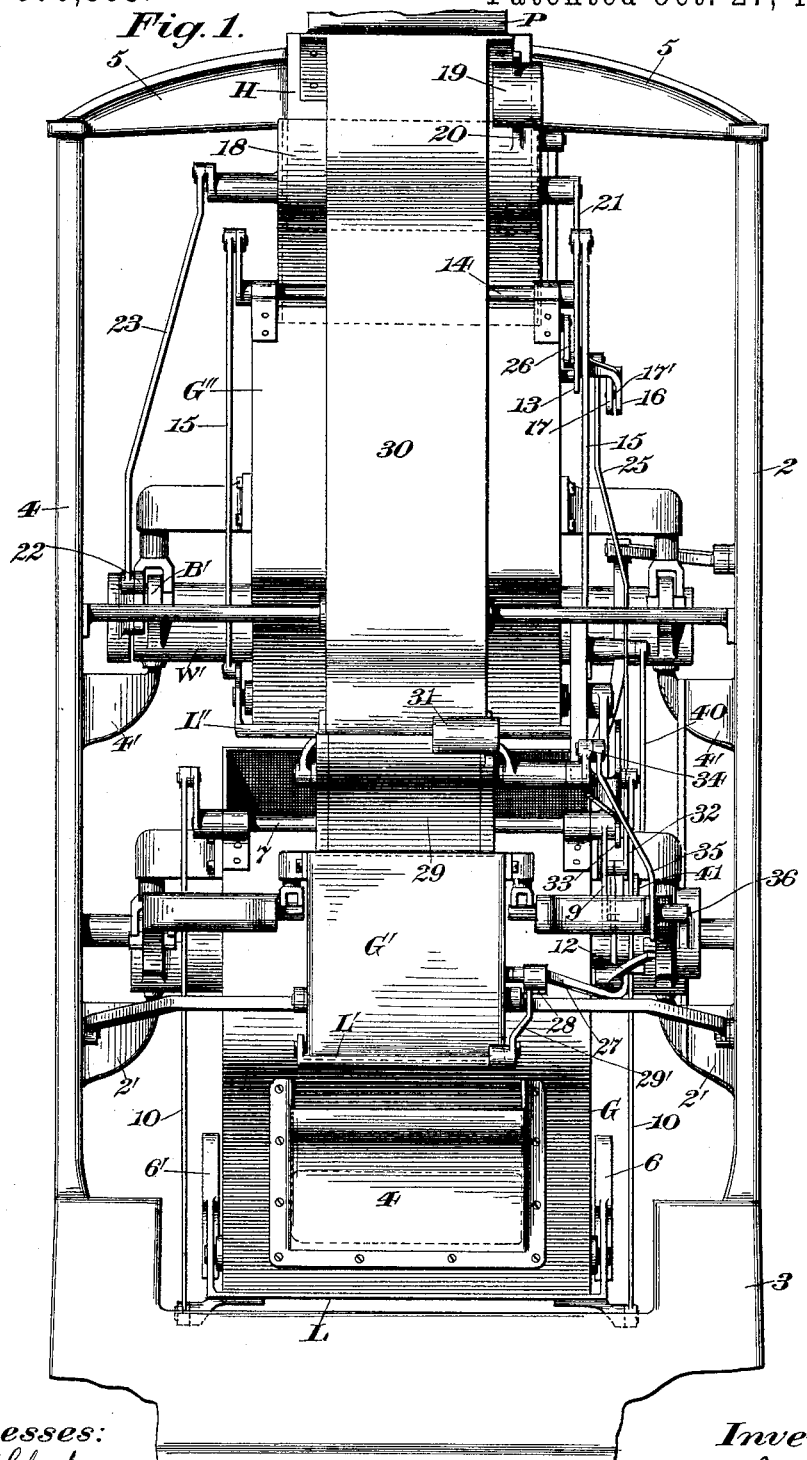
Figure 2:
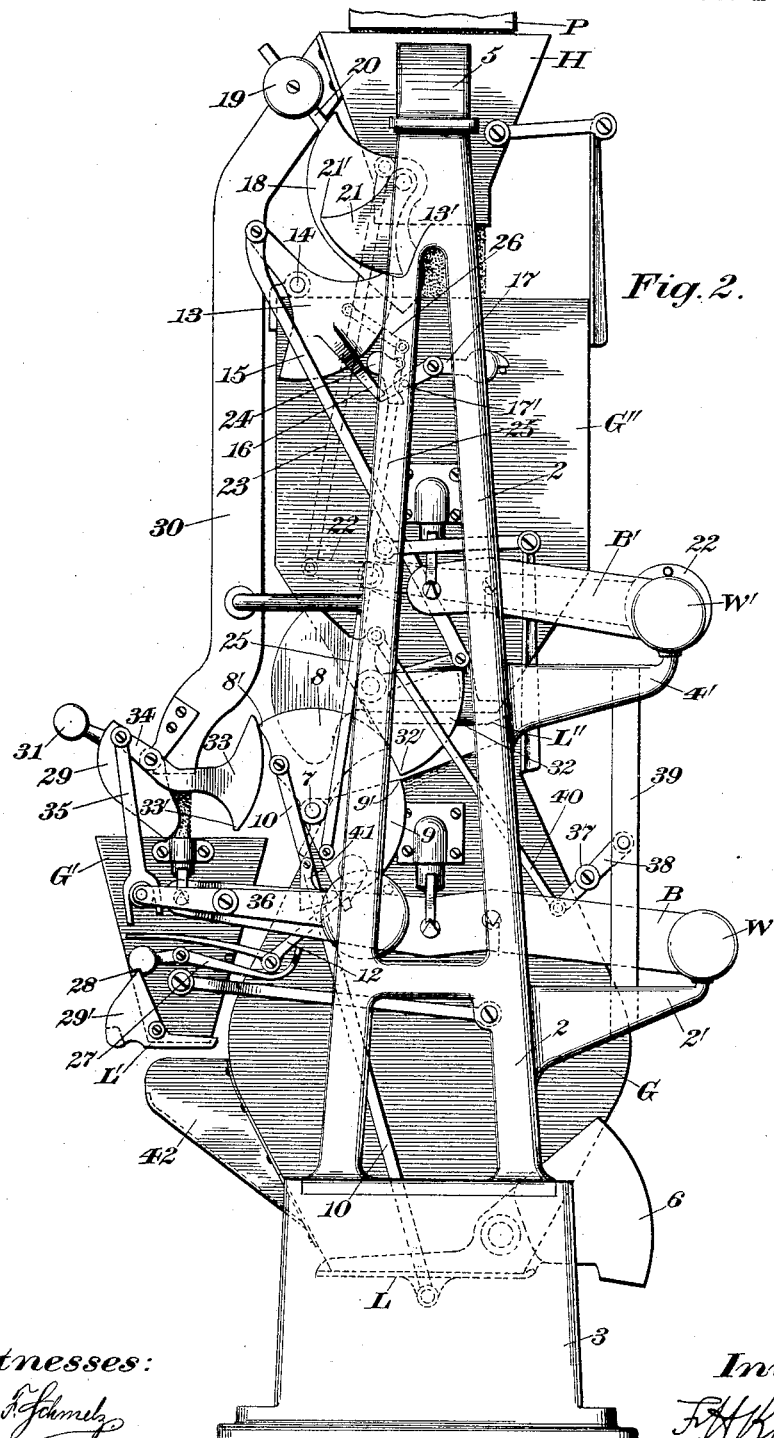
Figure 3:
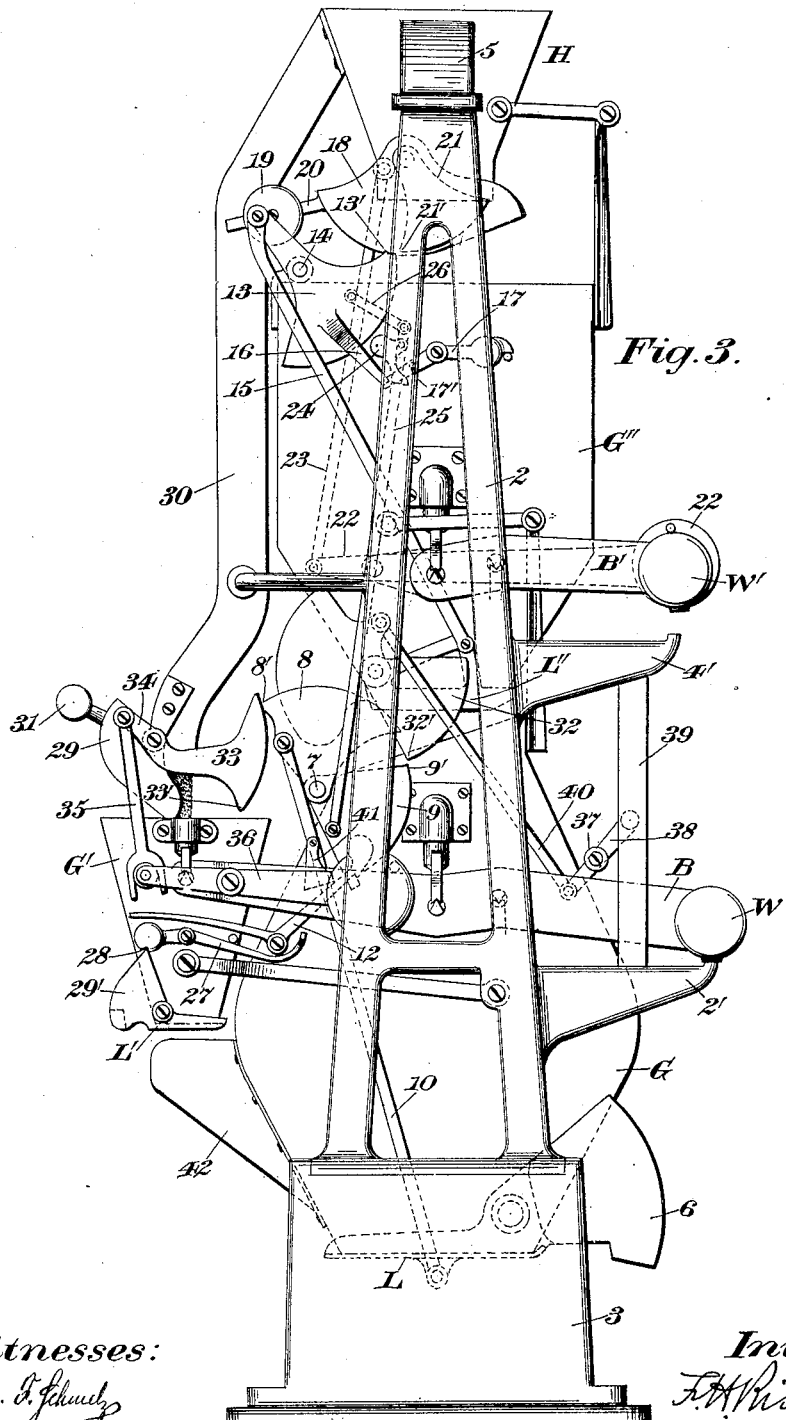
Figure 4:
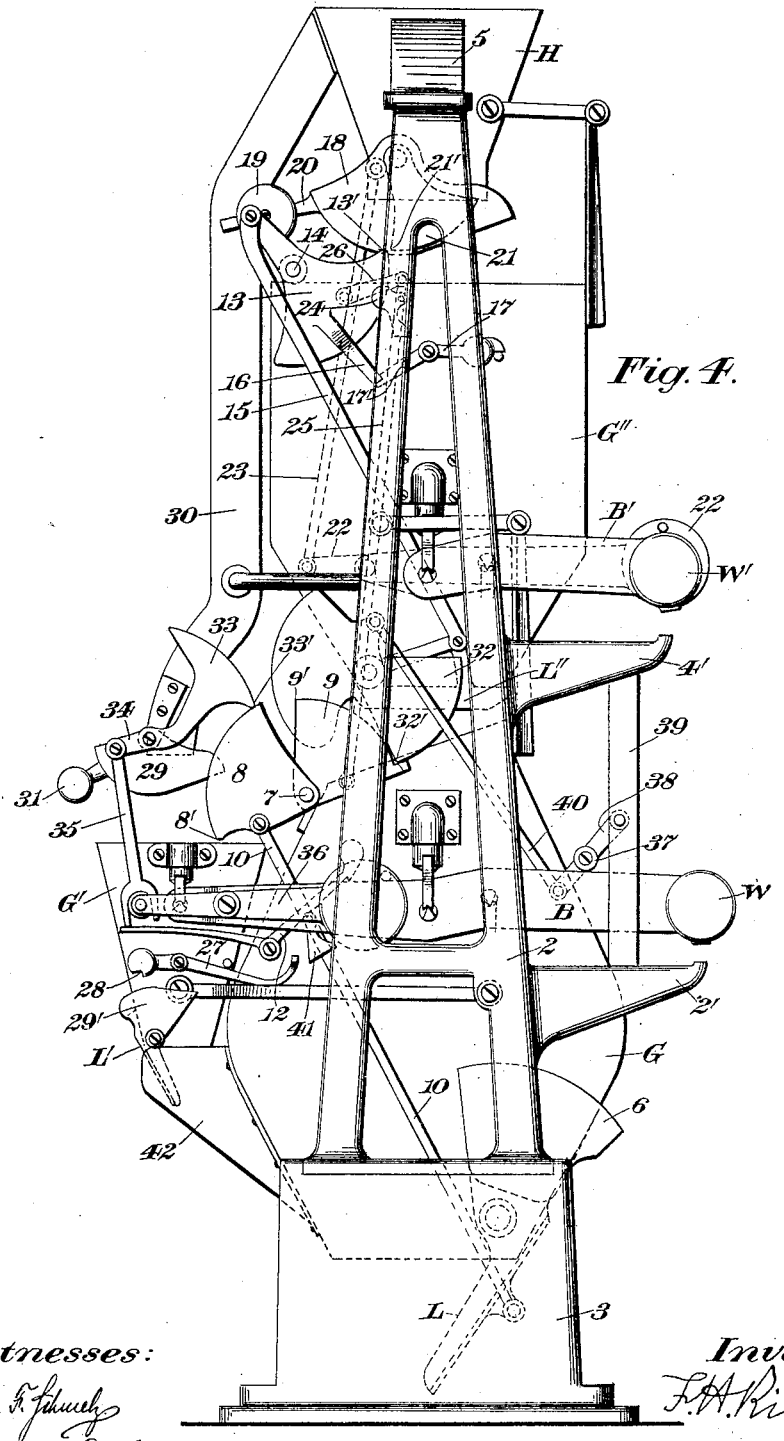
Figure 5:
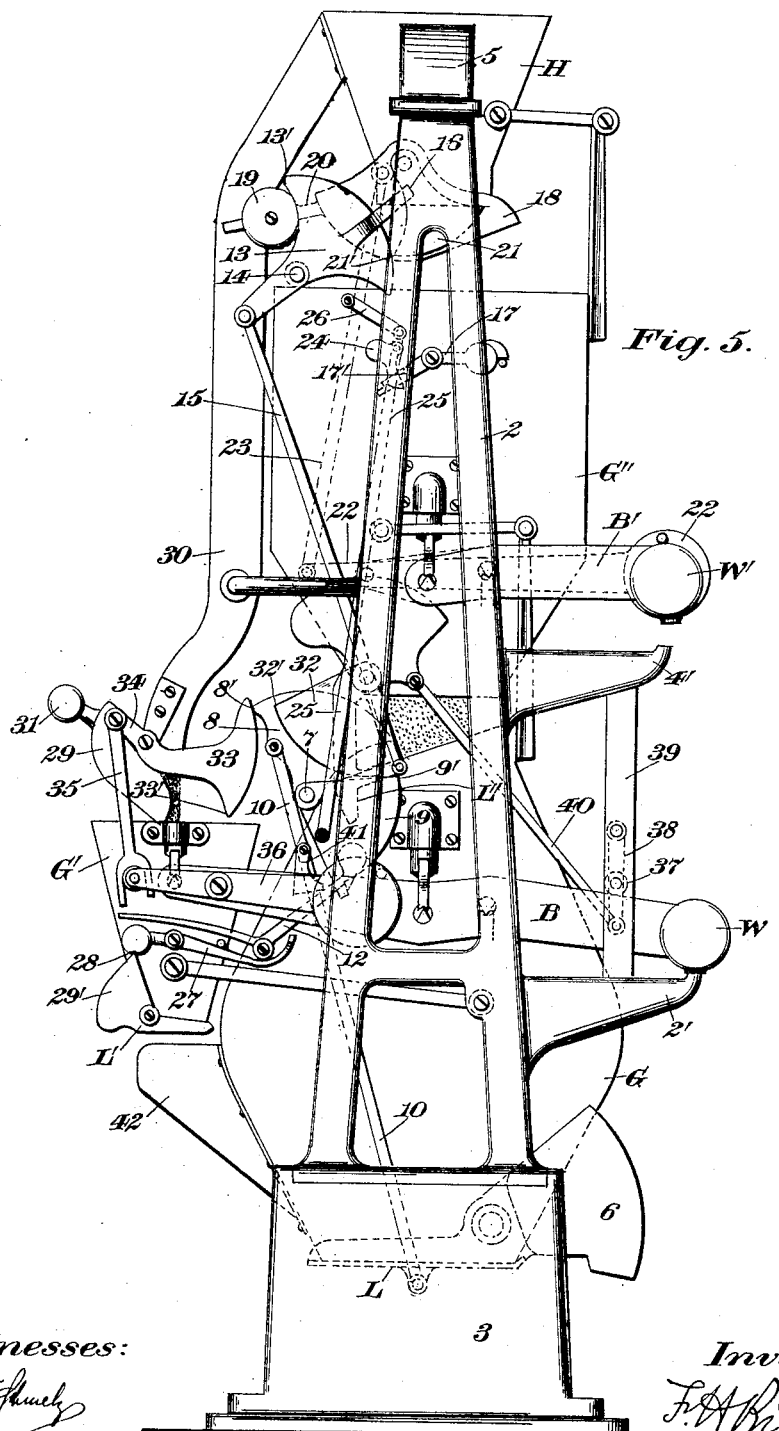

In the drawings accompanying and forming part of this specification, Figure 1 is a rear elevation of a weighing-machine comprehending my present improvements in the preferred embodiment thereof, and shows the positions occupied by the respective parts at the commencement of operation. Fig. 2 is an end elevation as seen from the right in Fig. 1, the parts being in positions corresponding therewith; and Figs. 3, 4, and 5 are views similar to Fig. 2, and show the operative parts of the machine in three successive positions.

Similar characters designate like parts in all the figures of the drawings.

My present invention involves, broadly, the combination, with main, rough, and auxiliary weighing mechanisms, each comprehending a suitable load-receiver, of means for effecting the discharge of the load-receivers of the rough and auxiliary weighing mechanisms into the load-receiver of the main weighing mechanism, whereby the machine is capable of performing rapid and accurate work, it being more especially intended for weighing materials in large lots or quantities—that is to say, the load-receiver of the main weighing mechanism will receive the contents from the load-receiver of the rough weighing mechanism, which is in the nature of a meter, said contents being discharged bodily or in bulk into the load-receiver of the main weighing mechanism and constituting the major part of a true load to be weighed, the auxiliary weighing mechanism being also located to deliver its charge to the main weighing mechanism, which charge constitutes a complement of said true load.

The framework for supporting the various parts and devices of the machine may be of any suitable or preferred character, and it is herein illustrated consisting of the end frames 2 and 4, mounted upon the chambered supporting-base 3 and surmounted by the top plate 5, which is attached thereto.

A supply chute or hopper is shown at H, it being conveniently formed integral with the top plate 5 and being also vertically disposed beneath the usual supply-pipe, a fragment of the latter being illustrated at P, Figs. 1 and 2.

Each of the weighing mechanisms embodies a suitable load-receiver, and those herein illustrated are buckets of the well-known "single-chambered" type, the main bucket being designated by G, the auxiliary bucket by G', and the rough weighing bucket or meter by G'', said buckets being supported for reciprocatory movements by suitable beam mechanisms.

The scale-beam for the main bucket G is designated by B and is fulcrumed on the framing of the machine. It consists of a pair of arms joined by the combined counterweight and connecting-shaft W, which latter, when the machine is at rest, is sustained by the rigid arms 2', projecting from the framework of the machine. The scale-beam B will be also furnished with suitable supports for the bucket.

For controlling the discharge outlet or opening of the main bucket G, I have illustrated a closer L, pivotally supported at one side of said outlet and consisting of a substantially flat plate. The closer will also be furnished with suitable means for returning it to its normal or shut position on the discharge of its contents, the counterweighted end plates 6 and 6' being illustrated for this purpose.

A transverse rock-shaft is shown at 7, it being journaled in brackets located near the upper end of the rear wall of the bucket and having the segmental plates 8 and 9 rigidly connected thereto, said plates being in different vertical planes and also constituting stop members, as will hereinafter appear. The upper plate 8 has pivoted thereto the rod 10, the opposite end of the latter being likewise connected to the closer L, and it will be evident that when the plate 9 is restrained the closer L will be held against movement.

A counterweighted closer-latch is shown at 12 in the form of a lever, the arms of which are relatively long, the counterweighted arm of said lever or latch being furnished with a suitable hook or catch for engaging a shoulder or lug on the plate 9 when the closer is in its shut or normal position, as indicated in Figs. 2, 3, and 5. It will be evident that when the counterweighted arm of the latch 12 is raised or elevated clear of the lug on the plate 9 the closer L will be released.

The rough weigher or meter G'' is supported above the main bucket G and by the scale-beam B' in the usual manner, said beam, like the beam B, being fulcrumed on the framework and consisting of a pair of arms joined by the counterweight W', which latter rests on the rigid arms 4', extending from the framing when the machine is at rest. The capacity of the rough weigher G'' is slightly less than that of the main weigher G, and its contents will be discharged bodily or in bulk thereinto and will form the major part of the true load to be made up, the residue or balance of the true load being supplied by the auxiliary weighing mechanism. The outlet of the load-receiver G'' will be controlled by the closer L'', which is substantially similar in construction and mode of operation to the closer L and which covers a relatively large outlet of the bucket G'', so that the contents of the latter may be rapidly discharged.

A rocker is shown at 13 pivotally mounted near the upper edge of the bucket G'', it being fixedly attached to the transverse rock-shaft 14, which is journaled in brackets on said bucket, and having pivotally connected thereto the rod 15, which is similarly attached to the closer L''. The rocker 13 is furnished with the arm 16, which is in position to be engaged by the counterweighted latch 17 when the closer L'' is in its normal position, as indicated in Figs. 2, 3, and 4, said latch bearing against a suitable stud on the bucket when in its closer-holding position. The latch swings upward to engage the rocker-arm 16, and on its depression the closer L'' will be released, as will be apparent.

The supply-outlet of the chute or hopper H will be preferably controlled by a valve 18, said valve being pivotally supported beneath such outlet. It will be evident that when said valve is in its open position, as indicated in Fig. 2, a stream of material may gravitate from said chute or hopper and will be delivered into the bucket G'' by said valve. For closing the valve it is furnished with a counterweight 19, of proper efficiency, carried by the rearward-extending rigid arm 20 on said valve.

I have illustrated reciprocally effective stop mechanism operative with the closer L'' and with the supply-valve 18, the rocker 13 serving as one of said stops and the segmental blade 21, which depends from and is oscillatory with the valve 18, constituting the other stop, these members being segmental. The operation of the said stops will be apparent from an inspection of the several end elevations of the drawings. The valve 18 being open, the straight stop-face 13' of the rocker 13 will be approximately contiguous to the curved face of the stop or blade 21, (see Fig. 2,) so that if the latch 17 should be accidentally tripped the swinging movement of the rocker or stop 13 will be positively blocked by its mate until the curved face of the blade 21 has passed out of contact with the straight face 13', as indicated in Fig. 3, at which time the rocker is free to oscillate, provided the latch 17 is depressed; and as said rocker oscillates its curved face will ride along the point 21' of the blade 21, as indicated in Fig. 5, so that retractive movement of said blade, and hence opening of the valve, will be prevented, and this relation will continue so long as the closer L'' is open. When the closer is shut, the blade and the valve will be released, so that the latter may be opened.

For opening the valve 18 to permit the main stream to flow into the bucket G''', I have illustrated mechanism substantially similar in construction and mode of operation to that shown and described in Letters Patent No. 548,840, granted to me October 29, 1895, to which reference may be had.

The beam B' is shown shiftably supporting the counterweighted lever 22, the force of which is normally added to the counterpoised side of said beam, the inner end of said lever being in contact with the thrust-rod 23, which depends from the valve and is jointed thereto. On the descent of the bucket G'' with a mass of material therein, the rod 23 impinging against the lever 22, the closure of the valve 18 by the counterweight 19 will be limited in correspondence with the descending movement of the scale-beam B', it being evident that said lever constitutes virtually a fixed extension of said beam.

When the valve 18 is locked against opening movement in the manner previously described, the closer being also open, the mass may be discharged from the bucket G'', and as said bucket is lightened, the weight of the beam B' overbalancing the same, it will be caused to rise, and the weight W' moving toward its supports 4', the arm of said beam will drop away from the counterweighted lever 22 in substantially the manner disclosed in my aforesaid Letters Patent, said lever being firmly held by the interlocking mechanism. When the valve 18 is released by the shutting of the closer L, the lever 22 will be also released, and resuming its normal position will impart an upward thrust to the rod 23 sufficient for causing the opening of the valve 18.

For tripping the latch 17 I prefer to employ means operative with the main weighing mechanism. A latch-tripper is shown at 24 in the form of a counterweighted dog pivotally mounted on the rod 25, said rod being pivoted at its extremities to the oscillatory blade 9 and a crank-arm 26 on the bucket G''. The latch tripper or dog 24 has a descending movement into engagement with the latch-pin 17', so that on the continuation of such movement the latch will be depressed and the closer L'' released.

It will be understood that when the closer L is open the closer L'' is shut, so that a rough load may be weighed out in the bucket G'' while the bucket G is discharging its contents. It will be assumed that the closer L is open, as indicated in Fig. 4. As it returns to its normal position, the blade 9 will be swung about its axis and the rod 25 drawn downward until the tripper 24 is carried into engagement with the latch-pin 17', so that the latch may be depressed. The latch-tripper will continue its downward movement and will ride past the pin 17', as indicated in Fig. 5. On the upstroke of the rod 25 the tripper or dog 24 will be met by the pin 17', which will cause the former to yield laterally sufficiently to allow it to pass by said pin, and when the latter action has taken place it will be caused to drop to its normal position by virtue of its counterweight, it being understood that said tripper is in the nature of a by-pass.

The auxiliary bucket G' may be conveniently suspended from the beam B, it being adapted to receive a charge of material necessary to complete the partial load which is discharged into the bucket G from the bucket G''. The outlet of the bucket G' will be controlled by the closer L', which is substantially similar to the closers L and L'' for the other buckets. For maintaining the said closer in its shut or normal position I have illustrated a counterweighted latch 27, the weighted arm of which is notched, as at 28, and is adapted to engage the point of the counterweighted closer-shutting plate 29', as illustrated in Figs. 2, 3, and 5, the effective movement of said latch being limited by a properly-positioned stop on the auxiliary bucket G'.

For supplying the auxiliary bucket G' with its charge of material I have shown a spout 30 communicating with the interior of the supply chute or hopper H, the outlet of said spout being located over said bucket and controlled by the oscillatory valve 29, which is suitably supported adjacent to said outlet.

For closing the auxiliary supply-valve 29 it may be furnished with the counterweight 31 on the end of a rigid arm projecting from the valve.

I have illustrated herein reciprocally effective stops operative, respectively, with the closers of the two buckets G and G'', the function of said members being to maintain the closer L'' shut while the other is open, and vice versa. One of said pair of stops is shown at 9, the coöperating stop being designated by 32 and consisting of a segmental plate oscillatory with the closer L''.

The operation of the two stops 9 and 32 will be apparent from an inspection of Figs. 4 and 5. On the opening of the closer L'' the blade 32 will swing therewith, and its curved face will travel along the point 9' of the coacting blade 9, so that the oscillation of the latter will be positively blocked, as indicated in Fig. 5. When the closer L'' has resumed its normal position and the curved face of the blade 32 has passed out of contact with the point 9', the blade 9 is free to oscillate, and its curved face will bear against the point 32', so that the movement of the member 32 will be effectually limited and the opening of the closer L'' will be prevented, as indicated in Fig. 4.

The blade 8, to which reference has been hereinbefore made, constitutes also a stop device, its effective period alternating with a stop operative with the auxiliary supply-valve 29, said valve-operative stop being designated by 33, the latter being oscillatory with said valve. The action of the coacting stops 8 and 33 is clearly illustrated in the several end elevations. The closer L being shut, as indicated in Figs. 2, 3, and 5, the flat face 8' of the stop 8 will be in contact with the curved face of the stop 33, the valve 29 being open, so that should the closer-latch 12 be prematurely tripped the oscillation of the stop 8 will be positively blocked by the coacting stop device 33, so that the closer L will be thereby held against opening movement. When the valve 29 has reached its cut-off position and the point 33' has intersected the plane of curvature of the curved face of the stop member 8, the latter is free to oscillate, provided the latch 12 has been tripped, and in so doing said curved face will be contiguous to the point 33', as indicated in Fig. 4, so that the valve 29 will be held against opening while the closer L is open and the bucket G is discharging the true load.

For opening the valve the following-described instrumentalities may be employed: The stop 33 is extended rearward to form a crank-arm 34, to which is pivoted the depending bifurcated thrust-rod 35, the bifurcation or fork of the latter embracing a projection—as a friction-roll—on the shiftable counter-weighted lever 36, which is supported by the beam B for oscillation. The weight of the shifting lever 36 will be furnished with a laterally-extending pin, which rests on an arm of the scale-beam B, so that, the inner end of said lever being in contact with the thrust-rod 35, the closure of the valve 29 by the counterweight 31 will be retarded, it being understood that the force exerted by the lever 36 is in excess of that of the counterweight 31. It will be also apparent that, as the valve 29 is locked against opening while the closer L is open, the lever 36 will be also held against return movement, though the weight of the beam W is free to move toward its supports 2' and the arm of said beam away from the lever 36. When the valve 29 is released, the lever 36, of course, will be free to return to its normal position, and in so doing will transmit an upward thrust to the rod 35, which is transferred to the valve 29 for forcing the same open.

It is desirable that the beam B should be blocked while the contents of the rough weighing-bucket G'' are being discharged into the main bucket G, as the force of impact of the mass is apt to cause the too rapid and too great descent of said bucket G and the premature operation of the several members which are controlled by said bucket. For this purpose I have illustrated a blocker operative with the closer L'' and consisting of a projection 37 in the form of an antifriction-roll mounted on the lever 38. The lever 38 is shiftably connected to the vertical bar 39, the latter being suitably attached to the arms 2' and 4'. A relatively long rod is shown at 40, jointed, respectively, to the lever 37 and also to a lug or ear on the closer L''.

The operation of the beam-blocking device just described is illustrated in Figs. 4 and 5, where the closer L'' is respectively shown in its shut and open positions. On the initial opening movement of the closer L'' a downward thrust will be imparted to the rod 40, and by the latter to the lever 38, so that the roll 37 will be caused to travel along the upper face of an arm of the beam B, the lever assuming a vertical position when it has reached the end of its effective stroke. It will be understood that when the lever 38 has reached such position the ascending movement of the counterpoised side of the beam W, and hence the descending movement of the bucket G, will be positively checked. On the shutting of the closer L'' the beam-checking influence of the projection 37 will be removed, so that the beam, with the two buckets G and G', may be poised by a supply of material from the drip-spout 30 to the auxiliary bucket G'.

It will be understood that while the charge of material from the bucket G' is being delivered to the bucket G the valve 29 will be open and will permit the flow of a comparatively fine stream or drip from the spout 30 into the auxiliary bucket to weigh out a charge therein, which, with the contents of the bucket G, constitutes the true load. The thrust-rod 35 constitutes a tripping device or tripper for the latch 12, and one of the branches of the bifurcation thereof has a movement into engagement with the free arm of said latch, whereby on the continuation of such movement the hook will be disengaged from the lug on the plate 9, so that the closer L will be forced open in the usual manner.

For tripping the latch 27 means operative with the main weighing mechanism will be employed, a latch-tripper, in the nature of a dog 41, pivotally supported on the rod 10 and having a movement into engagement with the free arm of said latch, being illustrated for this purpose. The rod 10 has a downward movement on the opening of the closer L, and the actuator 41 will be carried into engagement with the free end of said latch and will raise the weight thereof, so that the notch 28 will be disengaged from the point of the closer-plate 29', whereby the auxiliary closer L' may be forced open by the weight of the contents in the auxiliary bucket G'. Continuing its movement, the actuator 41, which is in the nature of a by-pass, will ride past the plane of the latch-arm, as illustrated in Fig. 4, and on the return stroke of the rod 10, as the closer L shuts, the actuator 41 will be met by the free arm of the latch 27 and will yield sufficiently to permit the rod and closer to resume their normal positions.

The contents of the auxiliary bucket G will be delivered into the spout 42 on the main bucket, the lower wall of said spout being inclined toward the discharge-outlet of said main bucket, so that at the conclusion of the weighing of a true load the contents from the bucket G' may readily gravitate through the outlet of the bucket G and be discharged with the partial or rough load which has been delivered thereinto from the bucket G''.

The operation of the hereinbefore-described weighing-machine is as follows: On reference to Fig. 4 the main bucket G and auxiliary bucket G' are shown discharging their contents, the latter into the former, such contents jointly constituting the true load. On the complete discharge of such contents the respective closers L and L' will be shut. On the shutting of the closer L an upward thrust will be transmitted to the rod 10 and transferred to the plate 9, drawing the latter, and hence the connecting-rod 25, downward, so that the latch-tripper 24 will be carried into engagement with the pin 17' on the latch 17, it being understood that at this time the two closers L and L' are locked shut by the latches 12 and 27. On the depression of the latch 17, the supply-valve 18 being closed and the auxiliary supply-valve 29 open, as indicated in Fig. 5, said latch will be disengaged from the rocker-arm 16, so that the closer L" will be released and may be forced open by the weight of the mass in the bucket G", such mass being delivered into the bucket G, which, for the time being, is locked against descending movement. While the contents of the bucket G" are being delivered into the bucket G a drip stream of material will be supplied to the bucket G' from the spout 30. On the shutting of the closer L" the checking influence of the blocking device 37 will be removed, so that the bucket mechanism, including the buckets G and G' and the scale-beam B, may be brought to an equipoise by the supply of material to the auxiliary bucket G'. When the load in the latter is completed, the valve 29 will be instantly shut, as illustrated in Fig. 4, and the rod 35 will be projected downward and into engagement with the free arm of the latch 12, thereby elevating the counterweighted arm thereof and disengaging the hook of the latter from the lug on the plate 9, so that the closer L will be released and forced open. On the opening of the closer L the rod 10 will be drawn downward until the tripper 41 meets the free arm of the latch 27, the notched counterweight of the latter being disengaged from the point of the counterweighted plate 29' of the auxiliary closer L', so that the latter may then be opened by the contents within the auxiliary bucket and such contents discharged into the spout 42, from whence they pass into the bucket G and through the outlet of the latter.

Having described my invention, I claim—

1. The combination with main, rough, and auxiliary weighing mechanisms, each comprehending a load-receiver; of means for effecting the discharge of the load-receivers of the rough and auxiliary weighing mechanisms into the load-receiver of the main weighing mechanism.

2. The combination with main, rough, and auxiliary weighing mechanisms, each comprehending a load-receiver; of a single scale-beam for supporting the load-receivers of the main and auxiliary weighing mechanisms; a scale-beam for supporting the load-receiver of the rough weighing mechanism; and means for effecting the discharge of the contents of the load-receiver of the rough weighing mechanism into the load-receiver of the main weighing mechanism, and for also effecting the discharge of the main and auxiliary load-receivers.

3. The combination with two weighing mechanisms, each embodying a load-receiver; of means for effecting the discharge of the contents of the first load-receiver into the load-receiver of the second weighing mechanism on the closing of the load-receiver of said second weighing mechanism.

4. The combination with two weighing mechanisms comprehending load-receivers, each of said load-receivers being supported by a scale-beam; of means for effecting the discharge of the first load-receiver into the second on the closing of the second load-receiver; and auxiliary load-supply means for said last-mentioned load-receiver.

5. The combination with weighing mechanism comprehending a load-receiver, of a bucket or meter; means for effecting the discharge of the contents of said bucket or meter into said load-receiver to form the major part of the true load to be weighed; and auxiliary weighing mechanism, also comprehending a load-receiver, for supplying the balance of said true load.

6. The combination with main and auxiliary buckets and beam mechanism for supporting the same, of a bucket or meter; means for effecting the discharge of the contents of the latter into the main bucket to form the major part of a true load to be weighed; and instrumentalities for blocking the action of the main bucket while such major supply is being delivered thereto.

7. The combination, with main and auxiliary buckets and beam mechanism for supporting said buckets; of a bucket or meter embodying a closer; means for effecting a discharge of the contents of said bucket or meter into said main bucket to form the major part of the true load to be weighed; and instrumentalities operative with the closer of said bucket or meter, for blocking the action of the main bucket while the contents of the former are being delivered thereto.

8. The combination with framework, of main and auxiliary buckets and beam mechanism for supporting said buckets; a bucket or meter comprehending a closer; means for effecting the discharge of the contents of said bucket or meter into the main bucket to form the major part of a true load to be weighed; and a lever mounted on the framework and operatively connected to said closer and having a projection adapted to ride along the beam mechanism, said lever being operatively connected with said closer.

9. The combination with framework, of main and auxiliary buckets; beam mechanism for supporting said buckets; a bucket or meter having a closer; means for effecting the discharge of the contents of said bucket or meter into the main bucket to form the major part of a true load to be weighed; a lever mounted on the framework and having a projection adapted to ride along the beam mechanism on the opening of said closer; and a rod operatively connected to said closer and lever.

10. The combination with two weighing mechanisms, each comprehending a bucket, said buckets being supported by independent scale-beams, and each provided with a closer; of reciprocally effective stops operative with said closers.

11. The combination with two weighing mechanisms, each embodying a bucket, one of said buckets having a spout; of means for effecting the discharge of the other bucket thereinto to form the major part of a true load to be weighed; an auxiliary weighing-bucket; and means for discharging the contents of the latter into said spout.

12. The combination with main and auxiliary weighing mechanisms, each comprehending a bucket, and beam mechanism for supporting said buckets, each of said buckets having a closer normally held against movement by means comprehending a latch; of a bucket or meter; means for effecting the discharge of the contents of said bucket or meter into the main bucket; and instrumentalities operative with the main weighing mechanism for tripping the latch of the auxiliary weighing mechanism, the latch of the main weighing mechanism being tripped by means operative with the auxiliary weighing mechanism.

13. The combination with main and auxiliary buckets supported by beam mechanism, of a bucket or meter; means for effecting the discharge of the contents of the bucket or meter into said main bucket to form the major part of a true load to be weighed; a chute or hopper for delivering material to said bucket or meter and controlled by a valve; a spout for supplying material to the auxiliary bucket and also controlled by a valve; valve-actuating mechanism; and means for effecting the discharge of said main and auxiliary buckets.

14. The combination with main and auxiliary buckets, each comprehending a closer, each of said closers being held against movement by means comprehending a latch; of a rough weighing-bucket, also supported by a scale-beam and comprehending a closer held against movement by means comprehending a latch; a tripper for said latch, operatively connected with the closer of the main bucket; and means for tripping the latches of the main and auxiliary buckets.

15. The combination with main and auxiliary buckets supported by beam mechanism, of a bucket or meter; means for effecting the discharge of the contents of the latter into said main bucket; a spout for supplying a stream of material to the auxiliary bucket; a valve for said spout; a rod operatively connected to, and depending from, said valve and operated by a lever shiftably supported by the beam mechanism; instrumentalities for discharging the contents of said main bucket; and means operative with the main bucket for maintaining said valve in its shut position while such main bucket is discharging its contents.

16. The combination with main and auxiliary buckets supported by beam mechanism, each of said buckets having a closer held against movement by means comprehending a latch; of a bucket or meter; means for effecting the discharge of the contents of said bucket or meter into the main bucket; a spout for supplying a stream of material to the auxiliary bucket; a valve for said spout; a depending rod connected to said valve and operated by a lever shiftably supported by the beam mechanism, said rod being also operative for tripping the latch of the main bucket; and means operative with the main bucket for maintaining said valve in its shut position while such main bucket is discharging its contents.

17. The combination with main and auxiliary buckets, each embodying a closer normally held against movement; of beam mechanism for supporting said buckets; a rough weighing-bucket supported by a scale-beam and embodying a closer normally held against movement; means for releasing the closer of said rough weighing-bucket; instrumentalities for releasing the closers of the main and auxiliary buckets; a spout for supplying a stream of material to the auxiliary bucket, said spout being controlled by a valve; valve-actuating mechanism; and means operative with the closer for the main bucket for maintaining said valve and the closer for the rough weighing-bucket shut while the closer for the main bucket is open.

18. The combination with a bucket having a discharge-outlet controlled by a closer, said bucket also having a spout provided with an inclined wall leading toward said outlet; of a bucket or meter; means for effecting the discharge of the contents of said bucket or meter into said main bucket; an auxiliary bucket; means for effecting the discharge of the contents of said auxiliary bucket into the spout of the main bucket; and beam mechanisms for supporting the several buckets.

19. The combination with main and auxiliary buckets, each comprehending a closer, said closers each being held against movement by means embodying a latch; of a rough weighing-bucket, also having a closer; means, including a latch, for holding said last-mentioned closer against movement; a rod operatively connected with the closer of the main bucket and carrying a pivotally-mounted tripper for the latch of the rough weighing-bucket.

20. The combination with main and auxiliary buckets, each of said buckets having a closer, each of which is held against movement by means comprehending a latch; of a rocking stop mounted on the main bucket and operatively connected to its closer, said rocking stop having a rod connected thereto; a rough weighing-bucket having a closer held against movement by means including a latch; a tripper on said rod for the last-mentioned latch; and a stop operative with the closer for the rough weighing-bucket and co-operative with said first-mentioned stop.

21. The combination with a main bucket having a closer normally held against movement, of closer-releasing means; a shaft mounted on said bucket and carrying a pair of stops, one of which is connected to said closer; an auxiliary bucket; a supply-spout for delivering a stream of material to said auxiliary bucket and controlled by a valve; a rough weighing-bucket furnished with a closer, said closer having a stop which is cooperative with one of said pair of stops, the effective period of the other of said pair of stops alternating with a stop which is operative with said valve.

FRANCIS H. RICHARDS.

Witnesses:
FRED. J. DOLE,
F. N. CHASE.